Figure 7:
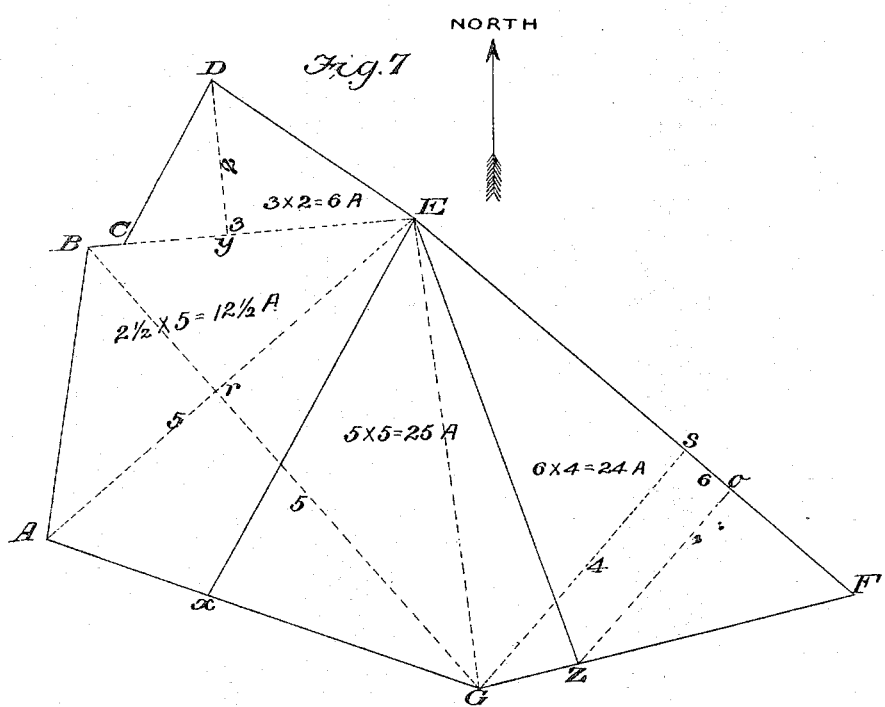

No. 640,270. Patented Jan. 2, 1900.
L. M. CARMICAL.
PLOTTING INSTRUMENT.
(Application filed Mar. 7, 1899.)
(No Model.) 3 Sheets—Sheet 1.
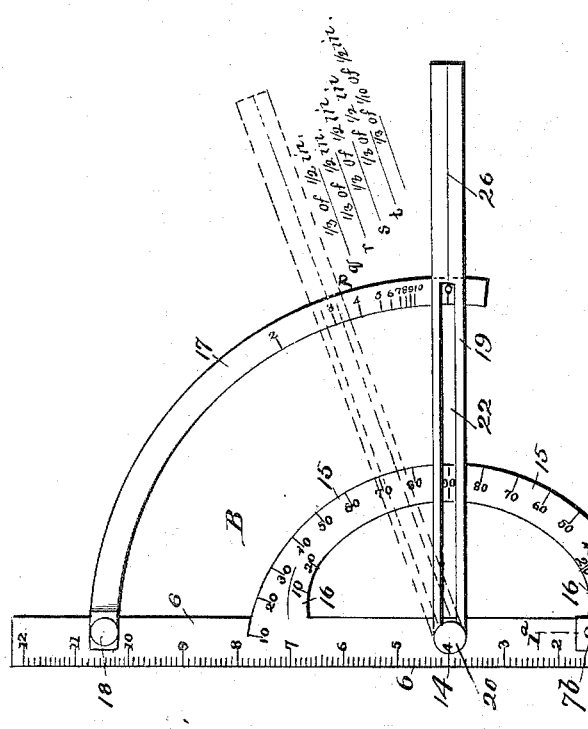
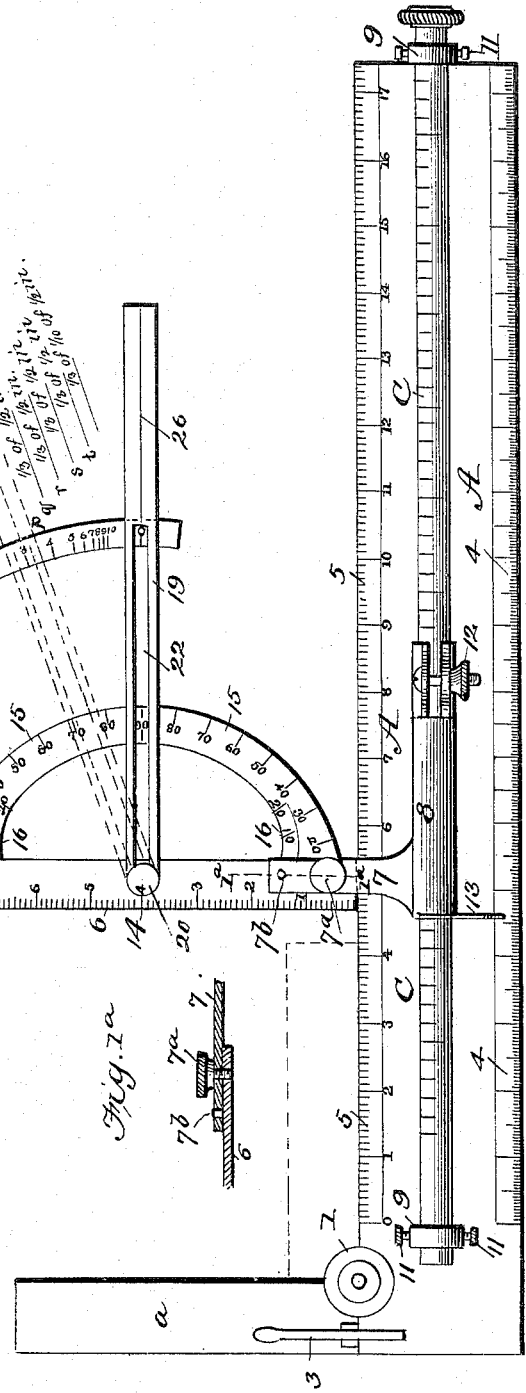
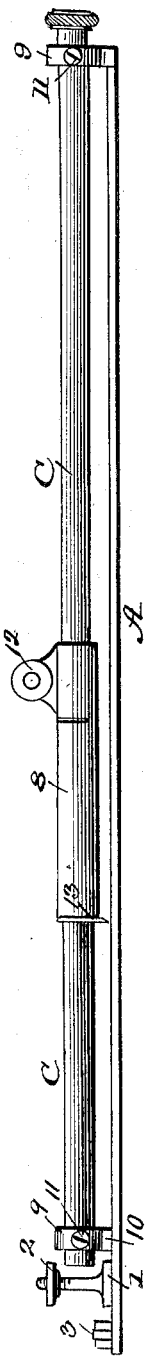
WITNESSES:
Jos. A. Ryan
Amos W Hart
INVENTOR
L. M. Carmical.
BY Munn & Co.
ATTORNEYS.

No. 640,270. Patented Jan. 2, 1900.
L. M. CARMICAL.
PLOTTING INSTRUMENT.
(Application filed Mar. 7, 1899.)
(No Model.) 3 Sheets—Sheet 2.
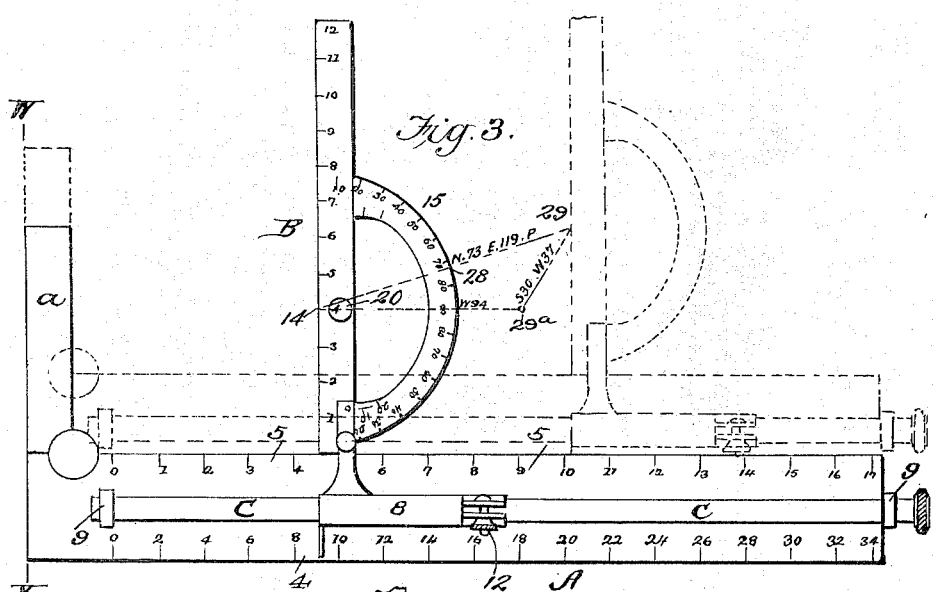
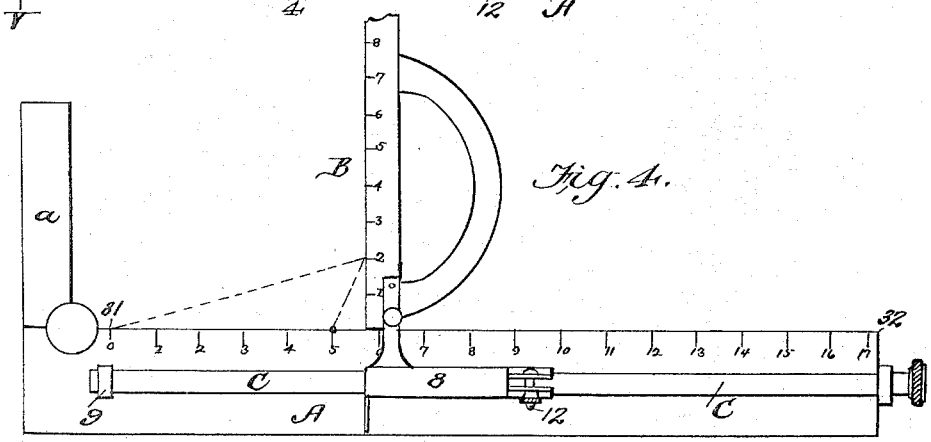
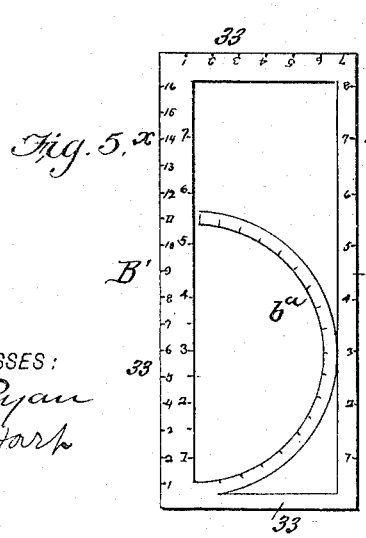
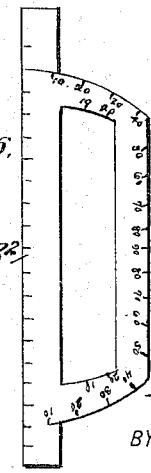
WITNESSES:
Jos. A. Ryan
Amos W. Hart
INVENTOR
L. M. Carmical.
BY
ATTORNEYS.

No. 640,270. Patented Jan. 2, 1900.
L. M. CARMICAL.
PLOTTING INSTRUMENT.
(Application filed Mar. 7, 1899.)

(No Model.) 3 Sheets—Sheet 3.

WITNESSES:
Jos. A. Ryan
Amos W. Hart

INVENTOR
L. M. Carmical.
BY Munn & Co.
ATTORNEYS.

UNITED STATES PATENT OFFICE.

LUTHER M. CARMICAL, OF JONESVILLE, VIRGINIA.

PLOTTING INSTRUMENT.

SPECIFICATION forming part of Letters Patent No. 640,270, dated January 2, 1900.

Application filed March 7, 1899. Serial No. 708,124. (No model.)

*To all whom it may concern:*

Be it known that I, LUTHER M. CARMICAL, of Jonesville, in the county of Lee and State of Virginia, have invented a new and Improved Plotting Instrument, of which the following is a specification.

My invention is an improved plotting instrument for use in expeditiously drafting the field-notes of a survey as usually obtained by compass and chain, in poles or feet, and ascertaining the area therefrom; also, for drawing maps.

The instrument is in as few parts as practicable and with a view to their easy detachment and to economy of space, so that they may be conveniently carried in vest or coat pocket.

The construction of the instrument and the manner of using it are as hereinafter described, referring to accompanying drawings, in which—

Figure 1 is a plan view, and Fig. 1$^a$ is a detail section on line 1$^a$ of Fig. 1. Fig. 2 is an edge view of the instrument. Figs. 3 and 4 are views illustrating the manner of using and the operation of the instrument. Figs. 5 and 6 show modifications of the protractor forming a part of the instrument. Fig. 7 is a diagram or plat for illustrating the use of the instrument in a particular case.

The base A of the instrument is a graduated bar having an arm $a$, which is attached to one end of the same at a right angle and whose outer edge or side is straight and of sufficient thickness to adapt it to be moved and held against any other straight-edged plane. The said arm $a$ is jointed to base-bar A at 1 to enable it to be folded upon the latter for economy of space when the instrument is not in use and is required to be carried in compact form. A spring-catch 3 is employed to aid in securing the arm $a$ rigidly in normal position, the same being pivoted to said arm, and the shorter arm adapted to enter a groove in the bar or plate A. The base-bar A is beveled on its opposite sides or edges 4 and 5, and the bevels have linear scales expressing any number of equal parts or divisions. In this case the lower bevel 4 has forty divisions to the inch, while the divisions of the inner bevel or edge 5 are of such values that their product into each other produces acres and decimal parts thereof when measuring triangles constructed upon the outer scale, as will be further described hereinafter.

A protractor B is attached to base-bar A by a slidable connection C—that is to say, the straight bar 6, forming the base of said protractor, is parallel to arm $a$ of base A and detachably secured to the lateral arm 7 of a tube or sleeve 8, which is adapted to slide upon a graduated bar C, removably attached to the base A parallel to the longitudinal middle of the latter. The attachment is made by a screw 7$^a$ and stud 7$^b$, as shown. This bar C is supported in the eyes 9 of short posts 10, that are set on base A and held by setscrews 11, passing through said eyes. By loosening the screws 11 the bar C may be adjusted in the posts, carrying with it the protractor B, whose straight edge may thus be used for section-lining or other ruling of parallel lines at right angles to base A, or by removing the protractor the bar A may be used as a parallel-ruler. The protractor-sleeve 8 has one end provided with a screw-clamp 12 and the other with a lateral wing or flange 13. The clamp is formed by slotting the end of the sleeve 8 on one side and providing the separated portions with parallel ears, through which passes a screw having a wing or milled nut. It is obvious that by rotating the latter the sleeve 8 may be clamped at any point on bar C and the protractor B thus secured in any desired adjustment—*i. e.*, distance from the arm $a$. The aforesaid wing or flange 13 serves as a pointer or index for the scale 4. Since it is found more convenient in practice to have the radiating point or center of the protractor B upon the outer edge of its base 6 by making such point at 14, part of the graduations of the semicircle 15 radiating therefrom are taken by the base 6. Hence this smaller part of the arc so taken or consumed requires a second arc 16, which is graduated in as many degrees as have been consumed, described from a point on the inner edge of bar 6. The latter also carries a third arc 17, attached to it by a thumb or clamp screw 18 and described from the point 20, which is in practice a clamp-screw, whose particular function is hereinafter stated. This arc is divided into unequal parts, which have the same relations to each other as the natural sines of the angles included by lines drawn through these graduations and a perpendicular to the base 6. In the construction here described these graduations are marked "2" to "10," inclusive. The arc 17 has an offset where it joins the base edge 6, so that its under surface may lie in the same plane with the latter. A straight arm 19 moves over the arc 17, the same being pivoted at the central point on protractor-base 6. It will be understood that this point is the center of radiation of arc 17. The arm 19 is pivoted by a clamp-screw 20, by which it may be held in any position—i. e., at any angle—to which it may be adjusted on the arc 17. It is slotted, as at 22, lengthwise to near the outer edges of the arc 17 for the purpose of accurately locating the arm 19 on said arc, which object is aided by a fine line 26, drawn centrally from slot 22 upon the outer end of bar 19.

The graduations of scales 4 and 5 of base-bar A have been already referred to in respect to measuring triangles. It may now be further stated that when the measurements in the field have been made—say in feet—and protracted by scale 4 on base A then the product of area-scale on protractor-bar 6 and the area-scale on bar A would be acres and decimal parts thereof without further reduction. The advantage gained by these extra scales is thus the mechanical reduction of square poles or square feet into acres.

I apply the term "area-scales" to scales 5 and 6 for the reason that their purpose is not for the measurement of the outlines of a diagram or plat, but merely to measure the base and altitude of the various triangles into which a plat may be divided, and their values must be of such relation to any assumed scale 4 engraved upon the instrument that their product into each other gives a result of a higher denomination than would be the case if the base and altitude had been measured by said scale 4, or, in other words, gives without further reduction the denomination most generally sought, which is acres.

The practical use of the instrument may be illustrated as follows: Let it be assumed it is required to protract and calculate the following field-notes of a survey: "N 73 E 119 poles, S 30 W 37 poles, W 94 poles, to the beginning." The edge of arm $a$ is placed against a straight edge or meridian-line V W (see Fig. 3) and assume the beginning-point 14 to be at 20. Mark off "73" from the outer edge of arc 15 at 28, scale the distance one hundred and nineteen poles from graduated edge 4 by turning the instruments around, placing its zero or "0" at 14 and the point 29 in a line with 14 28. To obtain the second line, the straight edge $a$ is again placed against the meridian-line and retained there, and the protractor is moved out along the rod $c$ until its edge comes to or reaches numeral 29, the extremity of one hundred and nineteen pole line, then the instrument is pushed along the straight edge or meridian-line until the center 14 of the protractor coincides with 29.

Then the degree or bearing of the second line S 30 W or its reverse N 30 E is pointed at 30 and the distance 28 to 30 measured thirty-seven poles from scale 4. The third line is projected in the same way to the beginning. The area of the triangle thus obtained may be calculated as follows, (see Fig. 4:) Place the zero-point of scale 5 at the western extremity of the base-line and measure the latter, noting that the eastern extremity falls at the forty-seventh division. Holding the base A in position against the base-line, slide sleeve 8 along bar C until the edge of upright protractor-scale 6 reaches the apex of the triangle. The altitude thus measured by scale 6 is 20 or the second larger division. Hence the base-line being found 4.7 and the altitude 20, their product gives 9.40 acres or nine and four-tenths acres without further reduction, the scales 5 and 6 thus performing division mechanically or at least obviating the necessity of its performance mentally; but scales 5 and 6 would not apply to scales of measurements of different value from scale 4 or lineal measures of different denomination than poles. Hence if the measurements of a field be made in feet and we desire to protract and calculate without reducing the lineal measurements to poles we would be under the necessity of measuring the bases and altitudes by scales differing from 5 and 6 taken together; but area-scales of any denomination below an acre may be to each other as the square root thereof or as the sides of a rectangle containing an acre. Hence we may retain scale 6 for one side of said rectangle and construct a scale for the other, such as that engraved upon rod C of the instrument.

To show in part the manner of using my instrument, I may further illustrate use of the latter in the partition of land among the heirs of an estate. Referring to Fig. 7, A B C D E F G represent the plat of a farm, plat by scale 4, representing forty poles to the inch, and the base-lines and altitudes of the various triangles in which the figure is divided are measured by scales 5 and 6. When we measure the triangle C D E, we find that the base-line C E cuts point "3" of area-scale 5 and the altitude of D reaches to "2" upon area-scale 6. Hence the area of triangle C D E is equal to $3 \times 2$, or six acres. Likewise in the trapezium A B E G base-line A E reaches from zero of scale 5 to the point 5, and the altitude Br reaches to 2.5 on area-scale 6. Hence $5.0 \times 2.5$ or $5 \times 2\frac{1}{2} = 12\frac{1}{2}$ A in the triangle A B E. The altitude $Gr = 5.0$ measures. Hence area $E A G = 5 \times 5 = 25A$. In the remaining triangle E G F base-line E F = 60, and altitude $Gs = 4.0$. Hence area $E G F = 6.0 \times 4.0 = 24.00A$, or $6 \times 4 = 24A$. Adding these together we find $6 + 12\frac{1}{2} + 25 + 24 = 67\frac{1}{2}$ acres, the area of farm. Now as these lands are to be divided into three parts equal in value it is found that eighteen acres, cut off next to line E F, will be a share, to obtain which we simply divide eighteen by six, (the base-line E F, measured upon scale 5,) which gives a quotient three for the altitude upon the area-scale 6. In practice we lay the edge of area-scale 5 along the line E F until they coincide and move out the area-scale 6 until the line F G is cut by the figure 3 upon said scale 6, which gives the point at Z, and we draw the line E Z. It is found that it will require twenty-eight and one-half acres to make a share on the northwest part of farm or ten acres southeast of the line E A, for the area marked on plot shows $6 + 12\frac{1}{2}$ acres northwest of said line. So we divide ten (acres) by five, (base-line A E,) which gives a quotient two for the perpendicular distance from base A E. Hence we place area-scale 5 upon line A F, with area-scale 6 turned southward, and move it out until "2" cuts the line A C at X, and the line E X will be the division-line sought. We may contrast the use of this instrument with others. Had we endeavored to obtain the area of the partitions simply by scale 4 it would have required more mental labor, (as it would have done in getting the areas of the whole figure,) for in this latter case to have known the number of acres in each separate triangle, as we have shown before, we should have had to divide the products of base and altitude by one hundred and sixty and by two, whereas we simply multiplied a smaller set of numbers, as though the area-scales had performed the function of cancellation or division, and so the mental labor is again abridged when we wished to cut off a stated number of acres. For instance, had we wished to cut off the triangle E F Z = 18 acres with my instrument we simply divide 18 by 6 = 3 for the point Z; but in theirs (or mine, had I no area-scales,) we must reduce eighteen acres to the same denomination as the line E F by multiplying 18 by 160 = 2,880. Then to get altitude we divide this number by one hundred and twenty poles, the length of line E F, (when measured by scale upon which it was protracted.) So $2{,}880 \div 120 = 24$, one-half the altitude, which we multiply by two to get Z O.

The division of a line or the sectioning of a space may be better understood by reference to Fig. 1. We are required to divide one-half inch into three equal parts, or, in other words, draw parallel lines one-sixth of an inch apart, which is done by moving arm 19 along arc 17, as shown by dotted lines, until its center line 26 reaches graduation "3" of said arc, where it is fastened by thumb-screw 20. In this position the perpendicular space passed over by the arm 19 will be equal to one-third the parallel space passed over by base-plate 6. Hence we set the outer edge of plate 6 at "0" or zero of scale 5, draw a line $p$ against the edge of arm 19. We next slide B to "1" on scale 5—that is, one-half inch—turn thumb-screw of sleeve 8 to hold B in place, mark off line $q$, which is one-third of one-half or one-sixth of an inch from line $p$. We move plate B (by sliding along rod C) another space or one-half inch to division "2" on scale 5, which movement places arm 19 one-third of one-half inch from line $q$, and line $r$ is marked off against its edge, and so on down to line $t$. In the illustration the last movement of B is not complete, but is stopped at the seventh smaller divisions between 4 and 5. Hence B has passed over seven-tenths of one-half inch, and 19 over one-third of seven-tenths of one-half inch equals seven-sixtieths of an inch between lines $t$ and $u$. Had B passed over but one of the smaller divisions the arm 19 would have traveled but one-third of one-tenth of one-half inch or one-sixtieth part of an inch, and as in this construction the smaller divisions on scale 4 on A are in value one-half the smaller divisions of scale 5 had B been stopped by passing over but one space of the smaller divisions of scale 4, (which may be noted by observing the sleeve-flange 13,) then the space would have been but one-half of one-sixtieth inch or one one-hundred-and-twentieth inch between the lines $s$ and $t$, and as there may be other graduations upon the upper plane of A, all subject to as many divisions as may be engraved upon arc 17, the number of equal parts into which any assumed unit or space may be divided becomes almost practically limitless.

I show in Fig. 5 a modification in which arc $b^a$ of a protractor B′ is inclosed by an oblong rectangular frame 33. The latter may give eight edges, four inner and four outer ones, upon which may be inscribed any convenient scales. The scales on the outer or side edges have divisions conforming to scales on base A. Along the base of the protractor just outside the graduations of the protractor proper is another scale whose graduations are equal to either one of the scales on the long side of frame 33 farthest from the base-scale. One object of this scale is to give the distance to any line $x\,z$ from the center of the protractor. It is also quite useful for measuring. When the pointer is placed against the proper degree upon the inner circle, it may be retained there. The end of the rectangle 33 being turned around throws this scale against the pointer, and the center of protractor being in a line with it the distance can most conveniently be pointed off from said scale without further movement of the instrument.

In Fig. 6 I show another modification B² of the protractor, the same having a base with two scales that conform to the scale of the base-bar A; also, two centers for protractor-degrees, one general center for all the degrees on the outside circle and an inner center and degrees for the part that laps on upright or base and forming, like the one before described, only a section of a circle of such a width that the degrees near to the center line or on each side of ninety degrees equal in magnitude the divisions of the scale on the inner side of base of protractor, thus measuring the distance between two parallel lines not far apart.

What I claim is—

1. The improved plotting instrument comprising the arm and base-plate A, which is provided with different graduations on each edge, a guide-bar arranged thereon longitudinally, a protractor having a base-bar arranged at a right angle to such guide-bar, a sleeve adapted to slide on the latter and rigidly attached to said protractor, and having a flange adapted to serve as an index for the adjacent graduated edge, the said sleeve having a clamping-section whereby the protractor may be held in any adjustment, substantially as shown and described.

2. The combination with a protractor and base-plate, and a guide-bar fixed on the latter, of a sleeve adapted to slide on the bar, and having a lateral arm 7, and a screw $7^a$, and stud $7^b$ which detachably, but rigidly connects said arm with the protractor as shown and described.

3. The improved plotting instrument, comprising the base-plate or straight edge having its opposite sides provided with lineal scales as specified, a graduated bar arranged on said plate parallel to its lengthwise middle, and the protractor having its straight base-plate provided with three arcs, two of which have different centers and all graduated as specified, and a swinging arm 19, which is pivoted on the straight portion of the protractor, and adapted to extend over the several arcs, as shown and described.

LUTHER M. CARMICAL.

Witnesses:
C. H. WILLOUGHBY,
LON COUK.